(12) United States Patent
Furness

(10) Patent No.: US 11,533,905 B2
(45) Date of Patent: Dec. 27, 2022

(54) WATERFOWL DECOY

(71) Applicant: David Furness, Davenport, IA (US)

(72) Inventor: David Furness, Davenport, IA (US)

(*) Notice: Subject to any disclaimer, the term of this patent is extended or adjusted under 35 U.S.C. 154(b) by 0 days.

(21) Appl. No.: 17/167,939

(22) Filed: Feb. 4, 2021

(65) Prior Publication Data
US 2021/0244014 A1  Aug. 12, 2021

Related U.S. Application Data

(60) Provisional application No. 62/970,876, filed on Feb. 6, 2020.

(51) Int. Cl.
*A01M 31/06* (2006.01)

(52) U.S. Cl.
CPC .................. *A01M 31/06* (2013.01)

(58) Field of Classification Search
CPC ..................................................... A01M 31/06
See application file for complete search history.

(56) References Cited

U.S. PATENT DOCUMENTS

| | | | |
|---|---|---|---|
| 10,321,674 B1* | 6/2019 | Goodwin | A01M 31/06 |
| 2011/0146132 A1* | 6/2011 | Young | A01M 31/06 43/3 |
| 2016/0205921 A1 | 7/2016 | Janzen, Jr. | |
| 2019/0116782 A1* | 4/2019 | Hanson | A01M 31/06 |

* cited by examiner

*Primary Examiner* — Joshua E Rodden
*Assistant Examiner* — Henry Hooper Mudd
(74) *Attorney, Agent, or Firm* — Shuttleworth & Ingersoll, PLC; Jason Sytsma

(57) ABSTRACT

A first portion and a second portion of a decoy where the first portion is weighted or weightable and the second portion is buoyant. A housing attached to the first portion of the decoy by a hinge. An actuator combined to the housing engages the first portion of the decoy to selectively raise and lower the first portion of the decoy into the water.

19 Claims, 4 Drawing Sheets

WATERFOWL DECOY

CROSS-REFERENCE TO RELATED APPLICATIONS

The present application claims the benefit of U.S. Provisional Application No. 62/970,876 filed Feb. 6, 2020, which is incorporated herein by reference.

TECHNICAL FIELD

The present invention relates generally to waterfowl decoys used for hunting and, more particularly, to waterfowl decoys that mimic real feeding behavior on the water.

BACKGROUND INFORMATION

Waterfowl hunting is a popular sport enjoyed by hundreds of thousands of individuals. The traditional style of waterfowl hunting is based on hunters attempting to lure waterfowl to fly within the effective range of the hunter's shotguns. The most common method for achieving this is for the hunter to place decoys resembling live waterfowl on the water in close proximity to the hunter's location.

One of the major problems experienced by waterfowl hunters is the lack of motion from traditional style static waterfowl hunting decoys. Live waterfowl are not attracted to decoys that are motionless on a smooth water surface. In fact, decoy spreads that have no movement can often spook wary waterfowl and hinder hunting success. Traditional decoys rely on wind for movement and waterfowl hunting often takes place on small impoundments or wetlands that need heavy winds to churn the surface of the water and move the decoys.

Accordingly, there is a need for a waterfowl decoy, movement system and method that better mimics real feeding behavior on the water.

SUMMARY

In accordance with one aspect of the present invention, a water decoy device is provided. The decoy device comprises of a decoy comprising a first section and a second section where the first section is weighted or weightable and the second section is buoyant. The first section can comprise a sold heavier material or can be weighted with water or be water-permeable to absorb water. The buoyant section can be hollow and filled with air or comprised of any substance lighter than water. A housing is provided for supporting an actuator and/or a power supply. A hinge combines the housing and the decoy. An actuator can be attached to the housing and a sliding mechanism powered by the actuator can be combined to the first section of the decoy to raise and lower the decoy in the water.

BRIEF DESCRIPTION OF THE DRAWINGS

These and other features and advantages of the present invention will be better understood by reading the following detailed description, taken together with the drawings wherein.

Figure 1:
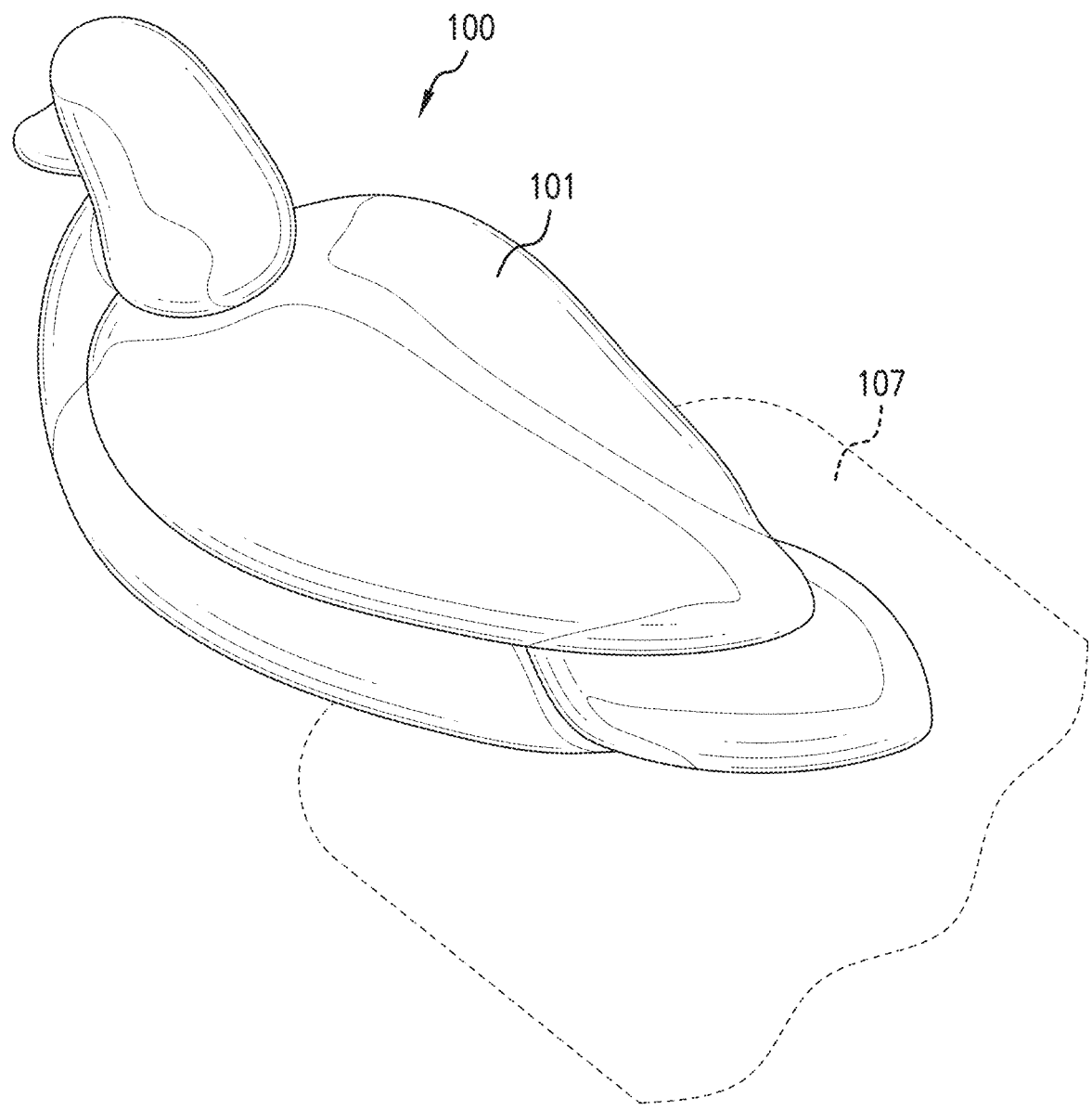
FIG. 1 is a perspective view a waterfowl decoy in the floating position in accordance with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the invention is to cover all modifications, equivalents, and alternatives falling within the spirit and scope of the invention as defined by the appended claims.

DETAILED DESCRIPTION OF THE PREFERRED EMBODIMENTS

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. It is understood that the features mentioned hereinbefore and those to be commented on hereinafter may be used not only in the specified combinations, but also in other combinations or in isolation, without departing from the scope of the present invention.

A decoy device 100 is shown in FIGS. 1-4 according to certain embodiments herein. Decoy device 100 effectively mimics the feeding activities of dabbling ducks, Canadian geese, and other waterfowl that forage for food beneath the water's surface. This movement, sometimes referred to as dabbling, includes the waterfowl tipping their bodies up in order to submerge their heads underwater. This is done so that they can forage the bottom of a wetland, submerged vegetation or aquatic life under the surface with their bill. Also, the motion of imitating a feeding waterfowl disturbs the surface of the water surrounding decoy device 100, which imparts motion to adjacent static waterfowl decoys.

Decoy device 100 comprises of a decoy 101 sized, shaped and colored to resemble a wide variety of waterfowl species, including both ducks and geese, according to various embodiments of the invention. Decoy 101 can be formed from a variety of materials, including plastic, foam and rubber, so long as it can float on the water or be supported by an attached flotation device. Decoy 101 can be flat bottomed or full-bodied. Additional appendages such as wings and legs or feet can also be provided according to additional embodiments. Decoy 101 can be colored using conventional means in order to best resemble the waterfowl of a given species and gender as may be desired by a given hunter.

FIGS. 1-4 illustrate an embodiment of the present inventive waterfowl decoy device 100, which includes decoy 101. Decoy 101 is separated into two portions, a first portion 101A and a second portion 101B. First portion 101A is the weighted or weightable section that allows the front half of decoy 101 to submerge to mimic dabbling. First portion 101A can be me made of a water permeable material, such a foam, sponge, or the like. First portion 101A, alternatively, can be made of a material heavier that second portion 101B. First portion 101A can alternatively be comprised of a cavity 125 filled with water permeable material, such a foam, sponge, or the like. In such an embodiment where decoy 101A comprises cavity 125 filled with water permeable material, the outer shell of first portion 101A can have slots 121 on the underside so that the water permeable material can absorb water. Alternatively, slots 121 can be a single round-hole shaped slot 121 to access internal cavity 125 and sealed by a plug 122 to manually fill cavity 125 with liquid, such as but not limited to water.

Second portion 101B has an internal cavity 124 that can be filled with air or of any substance lighter than water. This allows second portion 101B to remain buoyant. First portion 101A and second portion 101B can be formed together or can be formed separately and mechanically locked together by an integral or separate fastening system.

Decoy 101 is attached by a hinge 103 (which includes any similar swivel mechanism) to a housing 102 which is configured to sit below the water line and can be shaped as the profile of decoy 101 so that it is neatly concealed underneath decoy 101 when viewed from above. Decoy 101 will remain afloat due to the buoyancy of second portion 101B. In addition to or alternatively, a stabalization device 107 may be added to housing 102 to add additional buoyancy or can be implemented as a stake attached to housing 102 and staked into the ground. Stabilization device 107 may be advantageous, for example, if a heavier power source such as a rechargeable battery is used or if it is desired to fix decoy 101 into a specific position. Stabilization device 107 can be implemented as an additional floatation device, as show in FIG. 1. Stabilization device 107 can extend around second portion 101b of decoy 101 or it can completely surround decoy 101 or can extend on each side of front portion 101a of decoy 101 to provide additional stability.

Figure 3:
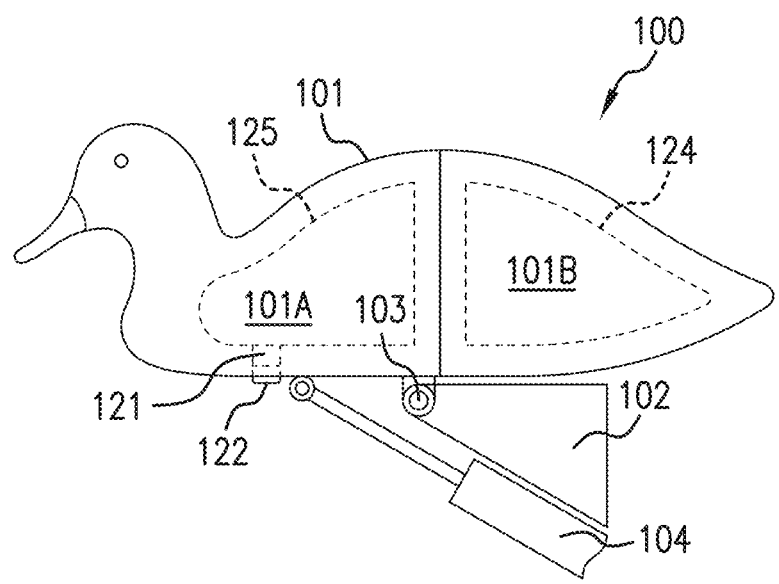
FIG. 3 is a side view of a waterfowl decoy of FIG. 1.

A remote-activated actuator 104 is shown attached to rigid housing 102. Actuator 104 comprises of a housing section 104A and a sliding mechanism 104B. FIGS. 1 & 3 show that when actuator 104 is remotely activated with sliding mechanism 104b extending from housing 104A so it moves against decoy device 101 and pushes decoy device 101 out of the water thereby producing movement of decoy 101 and producing movement of the surrounding and underlying water.

FIGS. 1 and 3 show that when actuator 104 is remotely activated, it moves sliding mechanism 104B of actuator 104 against the underside of first portion 101A of decoy device 101 and pushes first portion 101A of decoy device 101 out of the water thereby producing movement of the decoy device and producing movement of the surrounding and underlying water.

Figure 2:
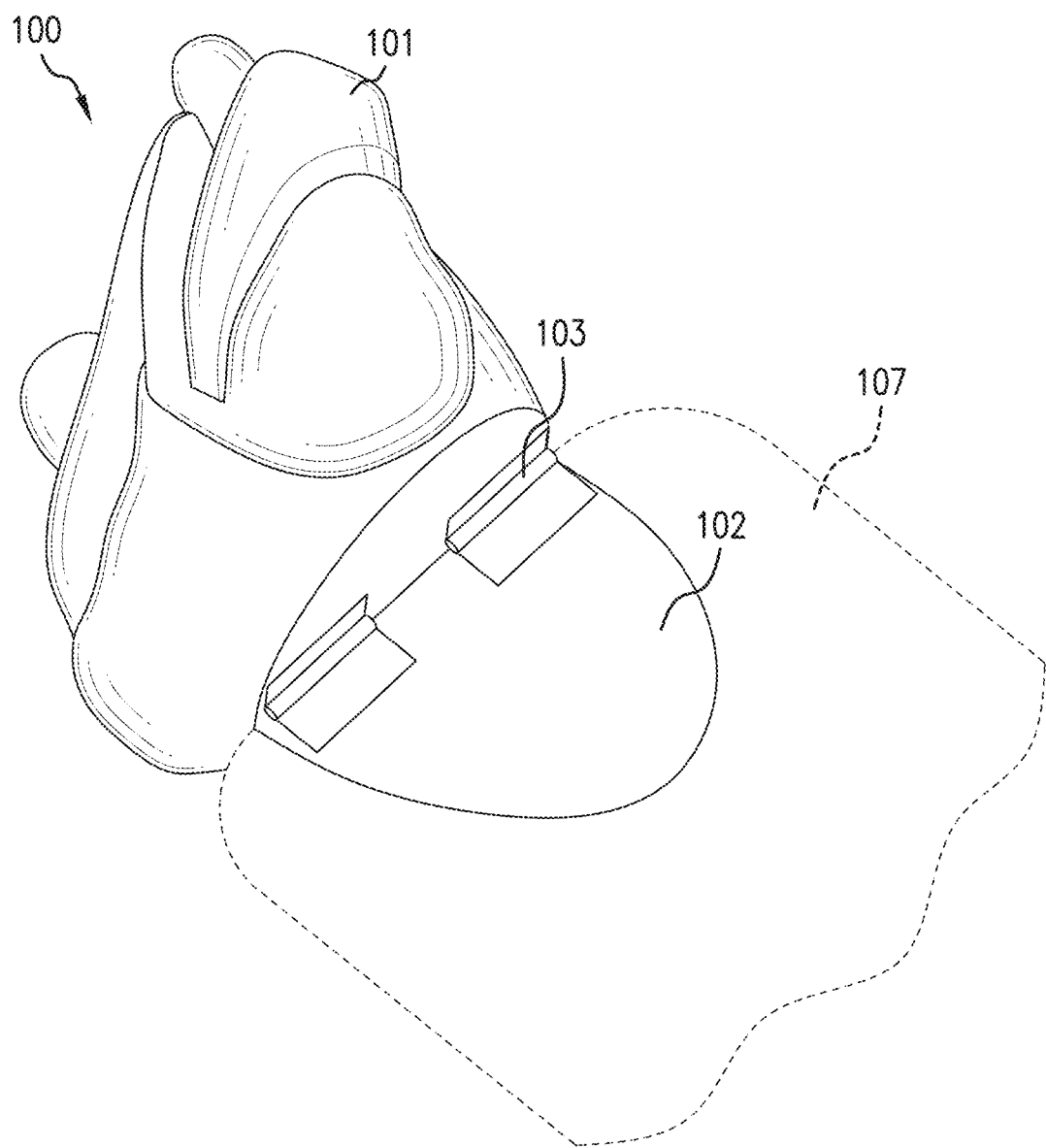
FIG. 2 is a perspective view a waterfowl decoy of FIG. 1 in the diving position.
Figure 4:
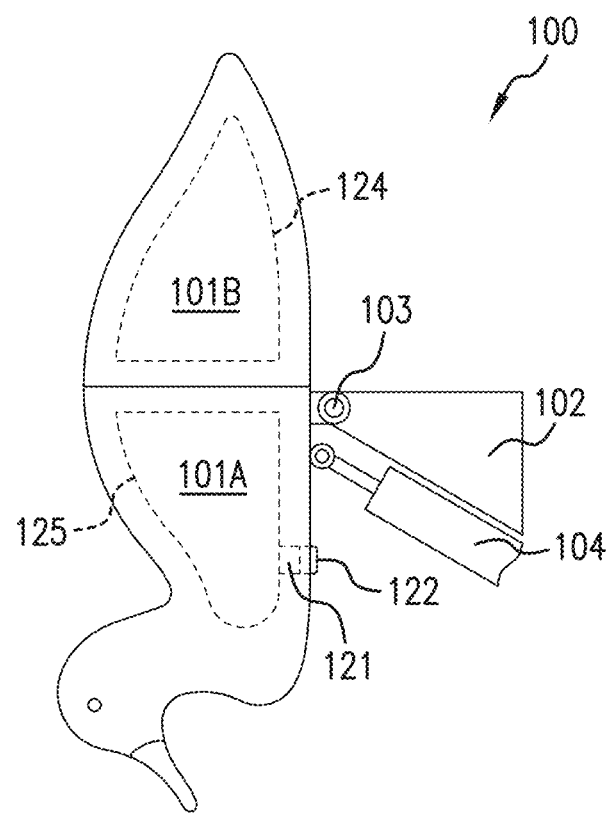
FIG. 4 is a side view of a waterfowl decoy of FIG. 1.

FIGS. 2 and 4 show that when the actuator 104 is remotely activated again, sliding mechanism 104B is pulled back into housing 104A to allow decoy 101 to dive back into the water by the weight of first portion 101A, thereby producing dabbling movement of decoy 101 and producing ripples in the water. Actuator 104 can be set to start/stop on a timer or remotely activated by remote control device or an application running on a smartphone device.

Figure 5:
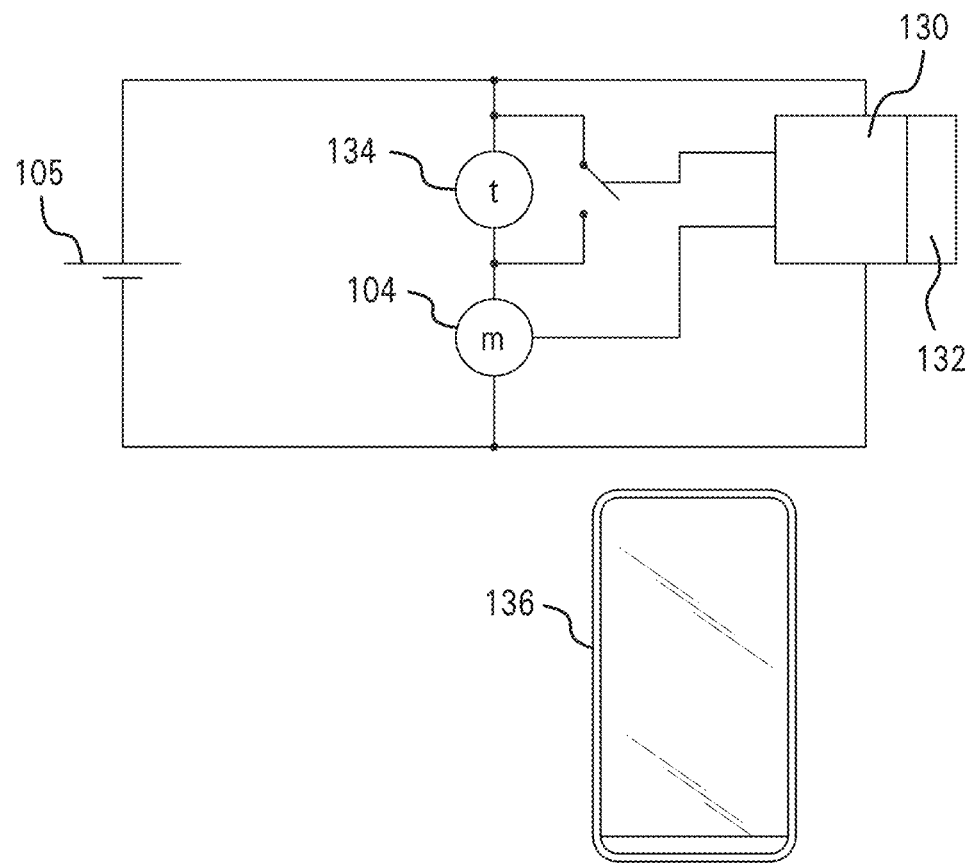
FIG. 5 is an electrical schematic drawing for operating the waterfowl decoy of FIG. 1.

FIG. 5 shows an electrical schematic for decoy device 100 to operate actuator 104. Actuator 104 which includes a geared mechanism requiring a power source 105 and operating circuitry described below, which will be housed either in first portion 101B that is full of air and waterproof or as part of the rigid housing 102. If a heavier power source such as a rechargeable battery is used, then stabilization device 107 may be used, as described above.

Within the interior of first portion 101B or housing 102 is power source 105. Power source 105 can be a rechargeable DC battery pack or the like. The rating of power source depends on the amount of features added to decoy device 100. In a simplified embodiment with a simple actuator 104, power source 105 can be a few AA batteries. Obviously, more electronic features added to decoy device 100 requires more power.

Actuator 104 can be automated by one or more timer switch(es) 134 so at scheduled intervals actuator 104 will retract or extend and remain the same for predetermined periods of time. Switch(es) 134 can be manually set by user-accessible setting thereon. Once activated, actuator 104 retracts and expands automatically simulating the dabbling action of the waterfowl.

Instead of manually operated and separate switch(es) 134, switch(es) 134 can be implemented electronically in a micro-controller 130 remotely controlled by a transceiver 132. In such instances, micro-controller 130 and transceiver 132 may be electrically connected to the power source 105 for operation. Control circuitry in micro-controller 130 can be connected to actuator 104 such that the controlling transceiver 132 can provide appropriate control commands as received from a remote control device 136.

In one embodiment, micro-controller 130 and transceiver 132 provide all wireless reception and transmission as well as control functionality for the decoy 100. Micro-controller 130 and transceiver 132 may be one or more solid state devices incorporating various silicon chips, amplifiers, antennae and other necessary components.

Remote control device 136 can be a dedicated device configured at discrete frequencies to communicate strictly with transceiver 132. Alternatively, remote control device may be implemented as an application downloadable on a smartphone. The wireless communication protocol can be cellular, Wi-Fi, Bluetooth®, Bluetooth® Low Energy or a combination thereof.

The motion of imitating a feeding waterfowl described herein more closely resembles the actual motion made by a feeding duck, goose or other waterfowl species than is provided by conventional motorized decoys.

The motion of imitating a feeding waterfowl described herein also disturbs the surface of the water surrounding the decoy, which imparts motion to adjacent static waterfowl decoys.

This movement of the decoy apparatus, method and system described herein is attractive to other waterfowl species because it indicates that there is food in the body of water and that there is safety due to the fact that there are already waterfowl using the body of water or wetland.

The decoy attracts other waterfowl visually in several ways: the flash of color from the decoy body when the feeding movement is created from the decoy, the ripples that are created on the surface of the water from the submerging decoy and the ripples that are created from the motion of the device on the water's surface. The realistic motion of the decoy therefore sends several visual signals that attract flying ducks.

The repetitive cycle of the decoy action also indicates a food source and safety for live waterfowl that see the movement of the decoy and the ripples on the water surface.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. A decoy device comprising:
   a decoy resembling a waterfowl and comprising a first portion and a second portion where the first portion is weighted or weightable and the second portion is buoyant, wherein the first portion of the decoy comprises a water-permeable material and is separable from and mechanically lockable to the second portion of the decoy;
   a housing;
   a hinge combining the first portion of the decoy to the housing;
   an actuator attached to the housing comprising a sliding mechanism that selectively engages the first portion of the decoy to urge the first portion of the decoy above the water and when retracted the first portion of the decoy is submerged.

2. The decoy device of claim 1, wherein the first portion of the decoy comprises a cavity accessible by a hole that is sealable by a plug, which cavity can be filled with liquid to weight the first portion so that the first portion of the decoy submerges due to the weight of the first portion of the decoy with respect to the weight of the second portion of the decoy.

3. A decoy device comprising:
   a decoy resembling a waterfowl and comprising a first portion and a second portion where the first portion is weighted or weightable and the second portion is buoyant;
   a housing;
   a hinge combining the first portion of the decoy to the housing;
   an actuator attached to the housing comprising a sliding mechanism that selectively engages the first portion of the decoy to urge the first portion of the decoy above the water and when retracted the first portion of the decoy is submerged, wherein the first portion of the decoy comprises a water-permeable material that absorbs water to weight the first portion of the decoy so that it is heavier than the second portion of the decoy so that the first portion of the decoy submerges due to the weight of the first portion of the decoy with respect to the weight of the second portion of the decoy.

4. The decoy device of claim 3, wherein the first portion of the decoy comprises of a cavity which is filled with the water-permeable material.

5. The decoy device of claim 4, wherein the first portion of the decoy comprises one or more slots on an underside of the first portion of the decoy so that the water-permeable material inside the cavity can absorb water.

6. The decoy device of claim 1, and further comprising a power source for powering the actuator, and a timer switch positioned electrically between the power source and the actuator for automating the sliding mechanism of the actuator based on the timing of the timer switch.

7. The decoy device of claim 1, and further comprising a micro-controller and a transceiver for remotely automating the sliding mechanism of the actuator by a remote operator.

8. The decoy device of claim 1, wherein the first portion of the decoy is heavier than the second portion of the decoy, which second portion of the decoy comprises of an internal waterproof cavity for housing a power supply for the actuator.

9. The decoy device of claim 8, and further comprising a stabilization device combined to the housing for supporting the decoy.

10. The decoy device of claim 9, wherein the stabilization device is buoyant to add additional floatation to the decoy.

11. The decoy device of claim 9, wherein the stabilization device is staked into the ground to keep the decoy afloat.

12. The decoy device of claim 9, and further comprising a power supply combined to the stabilization device and electrically connected to the actuator.

13. The decoy device of claim 1, wherein the housing is shaped such that when viewed from above corresponds to the shape of the second portion of the decoy.

14. The decoy of claim 3, and further comprising a micro-controller and a transceiver for remotely automating the sliding mechanism of the actuator by a remote operator.

15. The decoy device of claim 3, and further comprising a stabilization device combined to the housing for supporting the decoy.

16. The decoy device of claim 15, wherein the stabilization device is buoyant to add additional floatation to the decoy.

17. The decoy device of claim 16, wherein the stabilization device is staked into the ground to keep the decoy afloat.

18. The decoy device of claim 3, and further comprising a power supply combined to the stabilization device and electrically connected to the actuator.

19. The decoy of claim 1, wherein the first portion of the decoy comprises one or more slots on an underside of the first portion of the decoy so that the water-permeable material inside the cavity can absorb water.

* * * * *